INVENTOR
FREDERICK C. BRODERICK
BY Lawrence P. Barnett
ATTORNEY

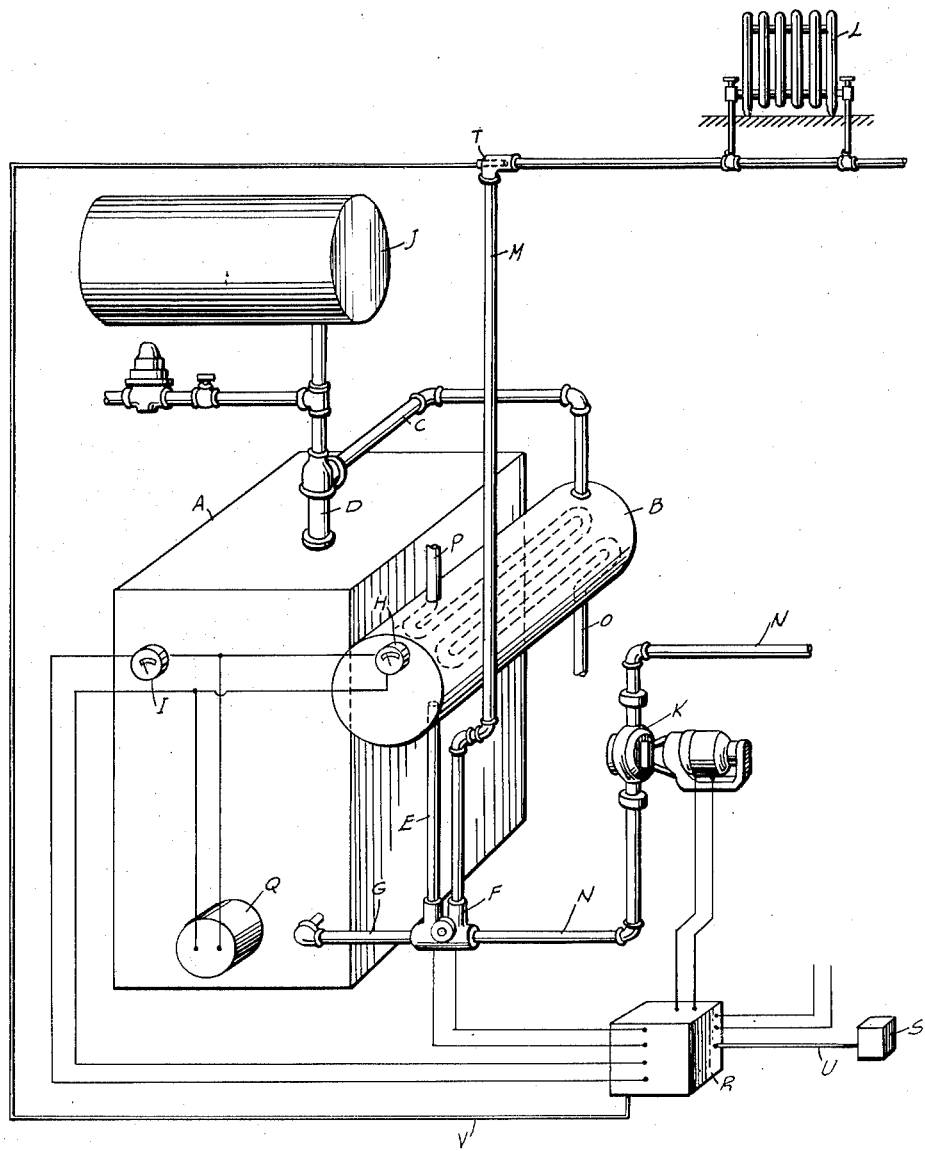
FIG. I
INVENTOR
FREDERICK C. BRODERICK
BY Lawrence P. Barrett
ATTORNEY April 18, 1950 F. C. BRODERICK 2,504,491
HEATING SYSTEM WITH MIXING VALVE
Filed March 20, 1946 2 Sheets-Sheet 2

Patented Apr. 18, 1950

2,504,491

UNITED STATES PATENT OFFICE 2,504,491

HEATING SYSTEM WITH MIXING VALVE

Frederick C. Broderick, Glencoe, Ill.

Application March 20, 1946, Serial No. 655,786

10 Claims. (Cl. 237—8)

This invention relates to a combined modulated house heating and domestic heating system with special mixing valve.

The primary purpose of this invention is to provide such a heating system embodying an automatically operable mixing valve that will give constant hot water for domestic use and will at the same time furnish a modulated heat within the house that will remain a constant desired temperature at all times.

Another object of this invention is to provide such a system that is quiet in operation and will not "over shoot" the desired maximum temperature to overheat the house and will furnish a heating medium that gradually cools when the maximum house temperature is reached.

Still another object of this invention is to provide a system wherein the heating medium is gradually brought to higher temperatures while circulating through the heating system.

A further object is to provide such a system that is economical to install and operate and yet is adjustable to fit the special heat demands of the place to be heated.

A still further object is to provide a novel mixing valve for use in such a system whereby part of the return water is combined with part of the freshly heated water from the boiler for circulation through the radiating system when the water in the system requires more heat but a portion of the freshly heated water combines with a part of the return water to be directed back to the boiler.

Other objects and advantages will be apparent from an examination of the following specification wherein the system and mixing valve are described in detail.

In its preferred form it combines a house heating system under joint control of indoor and outdoor thermostatic devices with a domestic hot water heating system. However, it may well be used in a house heating system without being combined with a domestic hot water heating system. When there is no demand for heat from the radiating system, the heating unit, such as an oil burner, will be controlled by a device, such as a boiler thermostat, set to maintain a certain temperature in the heat exchanger for the domestic hot water heating and the circulation of heated water from the boiler through the hot water heat exchanger will be solely by gravity circulation. When heat is demanded for the radiating system then not only will the burner be turned on but also a circulating device, such as a pump, will be started in operation and by automatic opening of a mixing valve there will be a forced circulation through both the radiator system and the domestic heating system. The heated water from the boiler will, by virtue of the opened mixing valve, be circulated through the heat exchanger and part through the radiating system and part returning to the boiler. A portion of the water from the return of the radiating system will because of the mixing valve be commingled with the hot water from the boiler without entering the boiler and will thus temper the water flowing through the radiator system. By this means the temperature of water in the radiating system will be gradually raised until the desired maximum temperature is reached.

By this means the pipes in the radiating system will be so gradually heated as to avoid sudden expansion strains and resulting noises, will not be overheated by "over-shooting" and will be gradually cooled whenever the valve is closed. Operation of the pump or circulator is continuous during the heating system subject to night shut down if desired.

When the heat demand of the system is satisfied the mixing valve will be closed and thereafter the circulation through the heat exchanger for the domestic requirements will be solely by thermo gravity. So long as this condition continues the operation of the boiler heater will be under the sole control of a thermostat suitably located.

By this arrangement, while the radiators are always kept warm enough to offset the heat loss of a building, they are never overheated and are never suddenly heated or expanded because of the smooth modulation of the temperature of the continuously circulating water.

The system can be readily adjusted to give any desired degree of room temperature and to compensate for differences in radiation. It reduces the cost of installation and provides economical operating costs. All this, in turn, results in an economical use of fuel. It also insures that the domestic water heater will not be by-passed when the radiator system is calling for heat.

These, and such other objects as may appear, are obtained by my invention, a typical embodiment of which is shown in the accompanying drawings in which Fig. 1 is a diagrammatic showing of a heating system embodying my invention.

Figure 3:
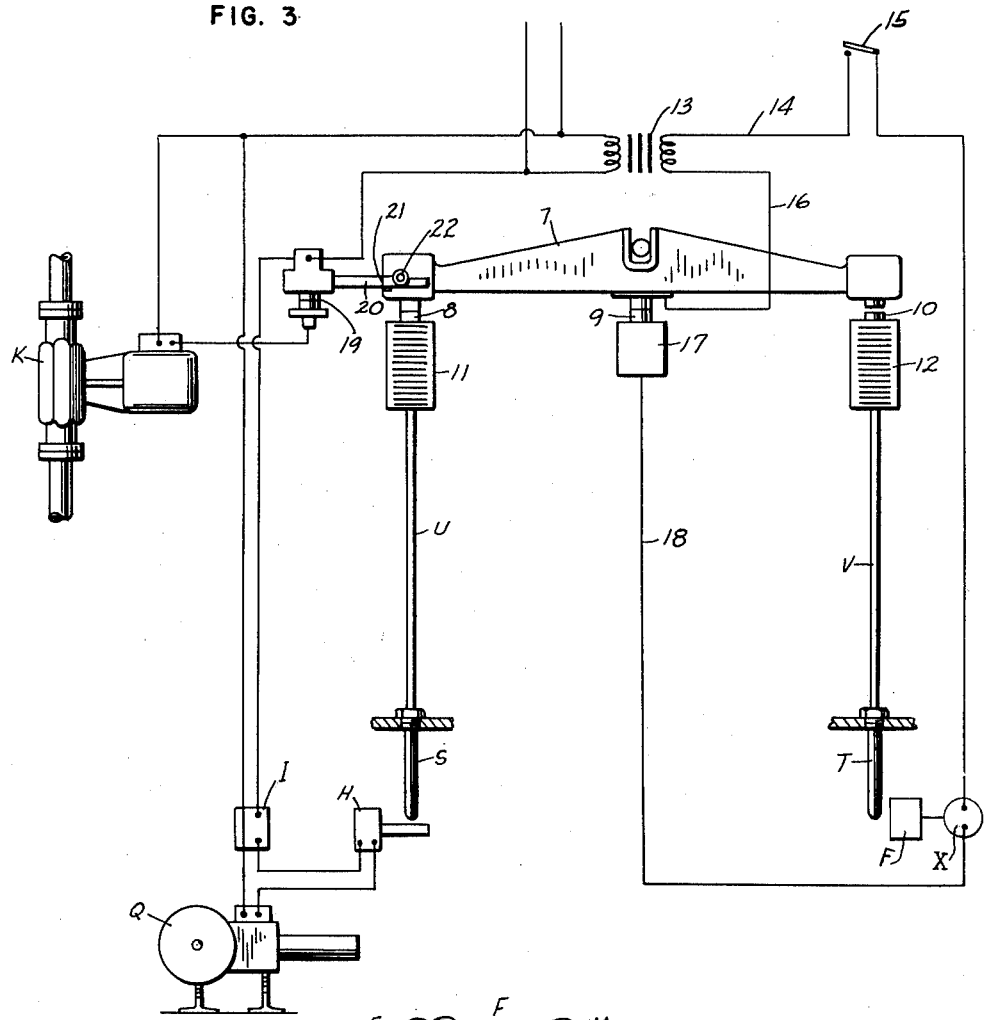
Fig. 3 is a typical wiring diagram of the system.

In the drawings A is a boiler in which the water is heated in any conventional way. B is a conventional heat exchanger for a supply of domestic hot water. C is a conduit connected with a riser D for drawing hot water from the boiler A. The hot water from the boiler A passes through the heat exchanger B and out through the conduit E through the mixing valve F and through the return pipe G to the boiler. H is a conventional device, such as a boiler thermostat, for controlling the operation of the heating device Q of the boiler depending upon temperature of water in heat exchanger B. As in common practice, the boiler thermostat may be set so as to start the heater when the water temperature in the heat exchange B drops below a certain point and shut it off when it exceeds the set point. I is a high limit boiler thermostat control which shuts off the heater Q when water in boiler reaches desired maximum temperature.

The usual expansion tank is shown at J, the pump or circulator is indicated by K and a radiator at L. Supply pipe M leads from mixing valve F to the radiating system and return pipe N leads from the radiating system to the mixing valve. Conduit O is the supply line for cold water leading into the heat exchanger B and pipe P is the hot water outlet leading from the heat exchanger to wherever the domestic hot water is to be used.

The main control apparatus for actuating the mixing valve F and the heating device Q and circulator K is indicated in general at R. An outdoor temperature bulb is indicated at S and a hot water temperature bulb at T in the radiating system. Temperature conducting tubes U and V lead from outdoor bulb and hot water bulb respectively to control apparatus R.

Figure 2:
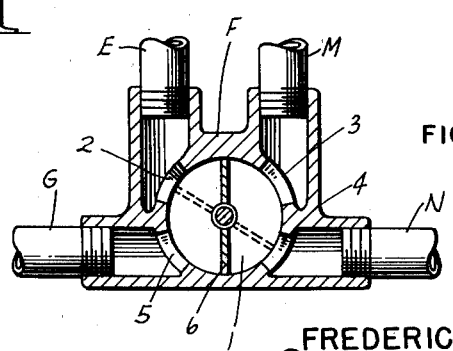
Fig. 2 is a detailed cross sectional view through the mixing valve.

The mixing valve F is shown in detail in Fig. 2 and comprises a central chamber 1 connected by four ports 2, 3, 4 and 5 to conduits E, M, N and G respectively. A valve wing or flap member 6 is rotatably mounted within chamber 1 and is adapted to be moved from position shown in full lines to that shown in dotted lines to bifurcate the inlet ports 2 and 4. The motor control for actuating the movement of valve member 6 may be as shown and described in my Patent Number 2,073,677. With valve member 6 in vertical position as shown in full lines in Fig. 2 two separate circuits are provided. Water will circulate by thermal gravitation from boiler A through conduits D, C, through heat exchanger B, through pipes E and G and back to the boiler. Also water will be circulated in the radiating system through pipe M, radiator L and back through pipe N by means of circulator K.

However when valve member 6 is in position shown in dotted lines in Fig. 2, the heated water from the boiler enters chamber 1 from pipe E where it is split, part of it flowing to supply conduit M and part to return pipe G. Also in this position the return water from the radiating system flows into valve F from pipe N. This return water is also split so that part of it flows back into supply pipe M to commingle with freshly heated water coming from the boiler and part is directed into conduit G to return to the boiler.

The electrical control apparatus R is shown in detail in Fig. 3 and comprises a floating rocker arm 7 adapted to be supported on bearings 8 and 9 or 10 depending upon the boiler water temperature. Temperature responsive bellows motors of well known kind adapted to expand when subjected to heat and contract when subjected to cold are indicated at 11 and 12, motor 11 being responsive to outdoor bulb S and motor 12 responsive to water bulb T through tubes U and V respectively.

The mixing valve wing or member 6 is actuated as described in my Patent Number 2,073,677 by an electric motor that is operated by a 20 volt electrical hook-up shown in Fig. 3. A transformer 13 reduces the usual 110 volt supply to 20 volts, one wire 14 leading to one side of motor X of mixing valve F. A switch 15 which may be a thermostat if desired is positioned in line 14 for breaking circuit for shut down at night, or during temporary absences from the premises. Another wire 16 leads to one side of switch 17 associated with bearing 9 and the other side of switch 17 is connected to the other side of motor X for valve F by means of wire 18.

Main control switch 19 is interposed in the electrical circuit operating circulator K and heater Q, switch arm 20 being pivotally connected with the end of rocker arm 7 adjacent motor 11. A stop 21 maintains arm 20 in horizontal position when arm 20 is moved upwards but pivot 22 permits that end of rocker arm 7 to be moved downwardly although switch arm 20 is in closed position.

When there is no demand for heat for the radiating system the valve 6 of the mixing valve will be in the position shown in full lines in Fig. 2. Under these conditions, with the heater for the boiler in operation, the gravity circulation will be through the riser D, the conduit C, the heat exchanger B, the pipe E and the return pipe G, the heater starting or stopping, as may be required, in response to the demands of the boiler thermostat H exposed to the temperature of the water in the heat exchanger B. Cold water is supplied to the usual domestic water coil in the heat exchanger through the inlet pipe O and heated water, as demanded, will flow out to the domestic water system through the outlet pipe P.

Bellows motors 11 and 12 are both positioned at opposite ends of rocker arm switch 7 and in actual use the motors and switch will be encased together as a relatively small unit.

As heretofore stated the circuit for actuating the mixing valve F comprises transformer 13 for reducing the usual 110 volts to 20 volts and switch 17 that is adapted to be closed or opened by movement of the rocker arm 7. When closed it will open the mixing valve by control means such as shown in my Patent Number 2,073,677 to permit circulation throughout the system but when switch is opened the valve wing 6 in mixing valve F will close to provide two independent circuits which are respectively the circulation from boiler A through heat exchanger B and return by thermal gravitation and the circulation through the radiating system without taking any water from the boiler which may be by forced circulation.

The operation of switch 17 is controlled by the temperature of the water in the radiating system through bulb T and motor 12 and by the outside temperature through bulb S and motor 11. As the outside temperature falls the bellows motor 11 will contract permitting rocker 7 to move downwardly to close switches 17 and 19, to open the valve F and actuate heater Q and circulator K. As water temperature rises motor 12 will expand to move rocker 7 to break switch 17.

As shown in Fig. 3 the water in the radiating system is cold and motor 12 is contracted. Outside temperature is cold and motor 11 is contracted and switches 19 and 17 are closed. As water is heated motor 12 will expand to contact rocker arm 7 to move it upwardly and break switch 17. As water again cools it will contract to close switch 17.

Switch 19, which controls the main circuit of the system to operate the heater motor Q and the circulating pump K, when closed, is operably connected with the rocker arm 7 adjacent the end where the motor 11 is positioned. As outside temperature falls motor 11 contracts to allow rocker arm to tilt to close switch 19. This starts heater motor and circulating pump. As outside temperature rises the motor 11 will expand to break the switch 19. However motor 11 is so adjusted that switch 19 will remain closed so long as outside temperature remains below given point, say 65° Fahrenheit. Thus heater and circulator will operate continuously while outside temperature remains below 65° except as the heater may be controlled by a high limit thermostat I positioned in the water of the boiler. The heater and pump are connected in parallel to be operable independently.

As outside temperature drops the motor 11 continues to contract to tilt rocker 7 to increase gap at bearing 10 between motor 12 and other end of rocker arm. This results in higher water temperature in system which is of course necessary because of the colder weather, due to the fact that the motor 12 must expand a greater distance to open switch 17 which will energize motor X to close mixing valve F.

To review briefly the operation of the system herein described the operation in winter while the outside temperature is below 65° will be as follows:

Bellows motor 11 due to lower outside temperature contracts to cause rocker arm 7 to lower to close switches 17 and 19. Switch 19 starts heater and pump and switch 17 closes the circuit to motor X to open mixing valve. Thus the water is heated and circulated through the system. Thermostat I in boiler shuts off heater when a given maximum boiler water temperature is reached but pump continues operation. Mixing valve closes to stop further circulation of water from the boiler when radiating system water temperature reaches a predetermined maximum, subject to further or supplemental control by motor 11 dependent upon outside temperature as before described.

In summer, the mixing valve remains closed to restrict circulation to thermal gravitation from boiler to heat exchanger and return, the boiler temperature being controlled by thermostat H in the heat exchanger B that actuates heater when needed.

Thus it will be seen that when the radiating system needs heat it will be furnished with freshly heated water mixed with return water to gradually raise the heat in the radiating system. This results in quieter operation and a more constant temperature and avoids filling the radiating system quickly with fully heated water that will cause the space being heated to become overheated. Also by mixing part of the freshly heated water with the return water that goes back to the boiler a more uniform temperature is maintained therein requiring less heat to increase it to meet demands of the system in cold weather and maintaining sufficient heat for the domestic hot water system.

The motors 11 and 12 may be adjusted to make and break the electrical circuit at whatever temperatures desired. As stated motor 11 is, in the example given, set to close switch 19 when outside temperature falls to 65° Fahrenheit. Motor 12 may be adjusted to break the circuit to close the mixing valve when water in the radiating system has reached any temperature believed sufficient to heat the space in which the system is positioned at a given outside temperature. The water temperature in the radiating system must be sufficient for the radiators to give off enough heat to equal the heat loss of the building. This will vary with outdoor temperature but the further contraction of motor 11 as temperature drops will provide for the additional heat in the radiating system because the gap at bearing 10 will be increased requiring the water in the system to reach a higher temperature before switch 17 will be broken. However, for example, it may be determined that radiator temperature of 90° Fahrenheit will give heat emission of 150 B. t. u. that will be sufficient to heat the premises with outside temperature of 60°. Motor 12 then is set to break switch 17 when this temperature has been reached in the system and outdoors. Other settings may be necessary but this will be obvious to anyone skilled in this art.

I claim:

1. In a hot water heating system comprising a boiler, a heater, radiating means, supply conduits connecting said boiler with said radiating means and return conduits leading from the radiating means to the boiler and a circulator for moving said hot water through said system, the improvement that comprises a mixing valve positioned in said system and provided with a plurality of ports and a valve flap and means for selectively moving said valve flap to either segregate the radiating means and circulator from the boiler to provide a separate circuit or to direct some of the heated boiler water mixed with some of the return water to the radiating means and to direct some of the heated boiler water mixed with some of the return water to the boiler.

2. In a hot water heating system comprising a boiler, a heater, radiating means, supply conduits leading from the boiler to said radiating means and return conduits leading from the radiating means to the boiler and a circulator, the improvement that comprises a mixing valve having a mixing chamber, four ports opening into said chamber, a valve member pivotally mounted within said chamber, said valve positioned between the supply and return of said heating system with supply conduits leading to and from the ports of said valve, one from the boiler and one to the radiating means, and return conduits leading to and from the ports of said valve, one from the radiating means and one to the boiler, and means for selectively moving said valve member to a position between the two supply conduit ports and the two return conduit ports and to a position bifurcating the supply port from the boiler and the return port from the radiating means.

3. In a hot water heating system comprising a boiler, a heater and radiating means, a mixing valve comprising a casing, a chamber within the casing, hot water inlet and outlet ports, return water inlet and outlet ports, the return inlet port being positioned directly across the chamber from the hot water inlet port, and the return outlet port being positioned directly opposite the hot water outlet port, a shiftable valve member positioned in said casing, conduits connecting the hot water inlet with the boiler and the hot water outlet with the radiating means, conduits connecting the return inlet with the radiating means and the return outlet with the boiler and means to position the shiftable valve member across the chamber to bifurcate the hot water inlet port and the return inlet port so as to direct some of the boiler water to the radiating means and some back to the boiler and simultaneously direct some of the return water to the radiating means and some to the boiler, said means operable to shift the valve member to a position across the chamber between the two hot water ports and the two return water ports whereby the hot water inlet port is connected wholly with the return water outlet port and the hot water outlet port is connected wholly with the return water inlet port.

4. In a hot water heating system the combination comprising a boiler, a heater, radiating means, a circulator, a mixing valve having inlet and outlet hot water ports and inlet and outlet return water ports, a chamber within said valve, a shiftable valve member mounted within and extending across said chamber, conduits connecting the boiler with the hot water inlet port and the radiating means with the hot water outlet port, conduits connecting the radiating means with the return water inlet port and the boiler with the return water outlet port, and thermostatic means responsive to the water temperature in the radiating system adapted to move said shiftable valve member to a position extending across the valve chamber from a point between the hot water ports to a point between the return water ports when the water in the radiating means has reached a predetermined maximum temperature and to move said valve member to a point extending across said chamber to bifurcate the respective inlet ports when the water in the radiating means falls below said temperature.

5. In a hot water heating system, a boiler, a heating device for said boiler, a heat exchanger for heating domestic water, radiating system for heating space, a circulator in said radiating system, temperature responsive controls for operating the heating device and circulator, a mixing valve comprising a casing, a chamber, hot water inlet and outlet ports, return water inlet and outlet ports, a shiftable valve member within the chamber, conduits connecting the boiler with the heat exchanger, the heat exchanger with the hot water inlet port, the radiating system with the hot water outlet and the return inlet ports, and the boiler with the return outlet port, and thermostatic means responsive to the water temperature of the radiating system for moving said shiftable valve member to a position extending across the valve chamber from between the hot water ports to between the return water ports when the water reaches a desired maximum temperature and for moving the shiftable valve member to a position across the chamber to bifurcate the respective inlet ports when the water falls below said temperature.

6. In a hot water heating system, a boiler, a heating device for said boiler, a heat exchanger for heating domestic water, radiating system for heating space, a circulator in said radiating system, temperature responsive controls for operating the heating device and circulator, a mixing valve comprising a casing, a chamber, hot water inlet and outlet ports, return water inlet and outlet ports, a shiftable valve member within the chamber, conduits connecting the boiler with the heat exchanger, the heat exchanger with the hot water inlet port, the radiating system with the hot water outlet and the return inlet ports, and the boiler with the return outlet port, and thermostatic means responsive to the water temperature of the radiating system for moving said shiftable valve member to a position extending across the valve chamber from between the hot water ports to between the return water ports when the water reaches a desired maximum temperature to separate the system into a boiler-heat exchanger circuit and a radiating system circuit, and for moving the shiftable valve member to a position across the chamber to bifurcate the respective inlet ports of the valve when the water falls below said temperature to cause a mixture of hot boiler water and return water to be circulated through both the radiating system circuit and the boiler-heat exchanger circuit.

7. In combination with a hot water heating system comprising a boiler, a heating device, a circulator, a radiating system and an outside temperature responsive control for operating the heating device and the circulator, a mixing valve comprising a chamber, four ports opening into said chamber, a shiftable valve leaf mounted within the chamber, fluid connections from the ports to the boiler supply, radiating system supply and return and boiler return respectively, and means responsive to the heat of the water in the radiating system for moving said shiftable valve member to bifurcate the ports connected with the boiler supply and radiating system return respectively and holding the valve in said position so long as the radiating system requires heat, said means adapted to move said valve member to a position across the valve chamber to separate the radiating system from the boiler and connect the radiating system supply and return for continued circulation of the water in said system.

8. In combination with a hot water heating system comprising a boiler, a heating device, a radiating system, and an outside temperature responsive control for operating the heating device a mixing valve comprising a chamber, hot water inlet and outlet ports, return water inlet and outlet ports connecting through said casing with said chamber, a shiftable valve member positioned within said chamber, conduits connecting the boiler with the hot water inlet and return water outlet ports respectively, conduits connecting the radiating system with the hot water outlet and return water inlet ports respectively, and means comprising an expansible bellows motor responsive to the temperature of the water in the radiating system adapted to expand to cause said shiftable valve member to move to a position extending across said valve chamber between the hot water ports and the return water ports when the radiating system requires no additional heat and to contract to cause said valve member to move to and hold a position bifurcating both the inlet ports so long as the radiating system requires heat.

9. In combination with a hot water heating system comprising a boiler, a heating device, a radiating system and an outside temperature responsive control for operating the heating device a mixing valve comprising a chamber, hot water inlet and outlet ports, return water inlet and outlet ports connecting through said casing with said chamber, a shiftable valve member positioned within said chamber, conduits connecting the boiler with the hot water inlet and return water outlet ports respectively, conduits connecting the radiating system with the hot water outlet and return water inlet ports respectively, and means comprising an expansible bellows motor responsive to the temperature of the water in the radiating system adapted to expand to cause said shiftable valve member to move to a position extending across said valve chamber between the hot water ports and the return water ports when the radiating system requires no additional heat and to contract to cause said valve member to move to and hold a position bifurcating both the inlet ports so long as the radiating system requires heat and thermostatic means responsive to outdoor temperatures adapted to cause said bellows to expand to an increasingly greater degree as the outside temperature falls before causing said shiftable valve member to move to said first position.

10. In a hot water heating system a boiler circuit comprising a boiler, a heater, and a heat exchanger; a radiating circuit comprising radiating means and a circulator; and a mixing valve comprising a chamber, boiler supply and return ports, radiating supply and return ports and a shiftable valve member in said chamber; conduits connecting the supply and return of the boiler circuit with the boiler ports and the supply and return of the radiating system with the radiating ports, and means for moving the valve member to a position to separate the boiler circuit from the radiating circuit when heat is not required by the radiating circuit and for shifting the valve member to a position to split the supply from the boiler and the return from the radiating circuit between the two circuits.

FREDERICK C. BRODERICK.

REFERENCES CITED

The following references are of record in the file of this patent:

UNITED STATES PATENTS

| Number | Name | Date |
| --- | --- | --- |
| 778,332 | Redman | Dec. 27, 1904 |
| 1,355,832 | Heffernan | Oct. 19, 1920 |
| 1,973,842 | Broderick | Sept. 18, 1934 |
| 2,073,677 | Broderick | Mar. 16, 1937 |
| 2,204,708 | Smith | June 18, 1940 |
| 2,211,573 | McGrath | Aug. 13, 1940 |
| 2,345,209 | Moore | Mar. 28, 1944 |
| 2,404,596 | Roche | July 23, 1946 |
| 2,404,597 | McClain | July 23, 1946 |